United States Patent
Rich

(10) Patent No.: US 6,500,104 B1
(45) Date of Patent: Dec. 31, 2002

(54) SEAT EXERCISE DEVICE

(76) Inventor: Rolland Wayne Rich, 3513 Gilionville Rd., Albany, GA (US) 31707

( * ) Notice: Subject to any disclaimer, the term of this patent is extended or adjusted under 35 U.S.C. 154(b) by 0 days.

(21) Appl. No.: 09/501,303

(22) Filed: Feb. 9, 2000

Related U.S. Application Data

(60) Provisional application No. 60/119,288, filed on Feb. 9, 1999.

(51) Int. Cl.[7] .............................................. A63B 21/04
(52) U.S. Cl. ........................ 482/123; 482/126; 482/130; 482/133; 482/142; 482/904
(58) Field of Search ................................ 482/123, 130, 482/142, 904, 129, 133, 910; 297/17, 217.1, 229, 255, 250.1, 464, 471, 466, 463.2; 601/24; D21/690, 692, 695; 280/304.1, 727

(56) References Cited

U.S. PATENT DOCUMENTS

| | | | | |
|---|---|---|---|---|
| 1,973,945 A | * | 9/1934 | Chavin et al. | |
| 4,013,287 A | * | 3/1977 | Dickman | 482/129 |
| 4,198,044 A | * | 4/1980 | Holappa | 272/135 |
| 4,373,716 A | * | 2/1983 | Pagani | 482/130 |
| 4,403,773 A | * | 9/1983 | Swann | 272/134 |
| 4,784,121 A | * | 11/1988 | Brooks | 482/131 |
| D319,273 S | * | 8/1991 | Fox | D21/692 |
| 5,141,482 A | * | 8/1992 | Hern | 482/123 |
| 5,149,314 A | * | 9/1992 | Ciolino et al. | 482/111 |
| 5,496,236 A | * | 3/1996 | Buonauito | 482/110 |
| 5,514,057 A | * | 5/1996 | Ciolino | 482/142 |
| 5,672,144 A | * | 9/1997 | Hulme | 482/140 |
| 5,743,838 A | * | 4/1998 | Willis | 482/124 |
| 5,860,897 A | * | 1/1999 | Gilbert et al. | 482/123 |
| 5,897,470 A | * | 4/1999 | Chen | 482/123 |
| 6,063,012 A | * | 5/2000 | Berkowitz et al. | 482/130 |
| 6,117,056 A | * | 9/2000 | Cataldi et al. | 482/123 |
| 6,159,133 A | * | 12/2000 | Shugg | 482/130 |
| 6,183,403 B1 | * | 2/2001 | Dunn | 482/129 |
| 6,220,994 B1 | * | 4/2001 | Rich | 482/123 |
| 6,245,001 B1 | * | 6/2001 | Siaperas | 482/123 |
| 6,261,213 B1 | * | 7/2001 | Frey | 482/121 |
| 6,299,569 B1 | * | 10/2001 | Rich | 482/123 |

* cited by examiner

Primary Examiner—Jerome W. Donnelly
Assistant Examiner—Victor Hwang
(74) Attorney, Agent, or Firm—Connolly Bove Lodge & Hutz

(57) ABSTRACT

An exercise device is provided for exercise of the limbs by a seated person. The device is a flat seat that can have a back attached. Typically, the seat and back can be cushions or similar articles that can be used in conjunction with existing seats in a vehicle. One or more resilient straps are provided with grips and attached around the perimeter of the seat and back so that the seated individual can perform exercise.

7 Claims, 2 Drawing Sheets

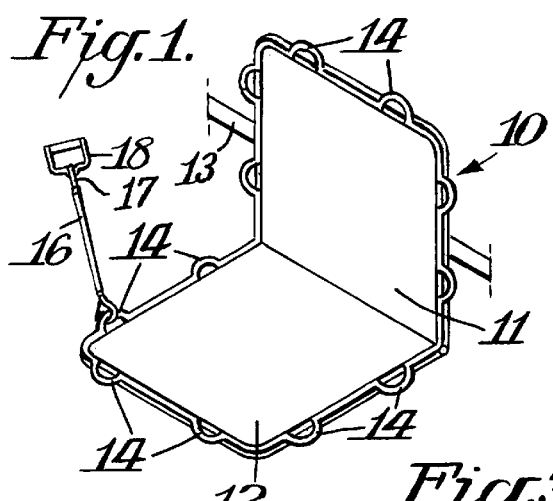
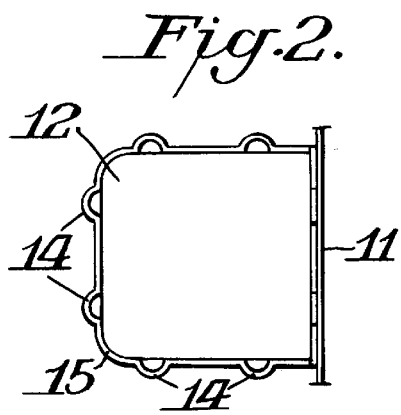
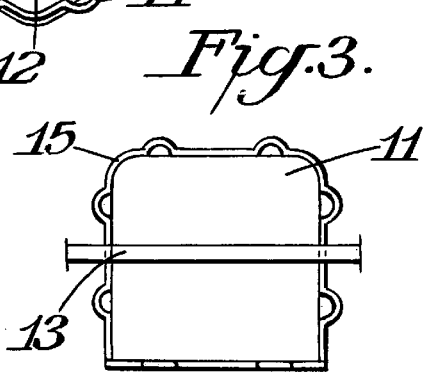
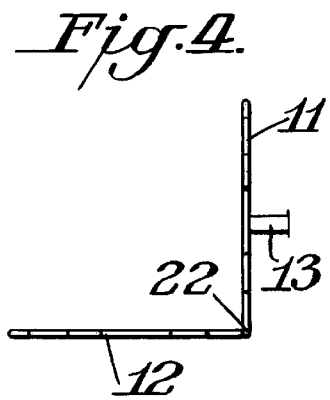
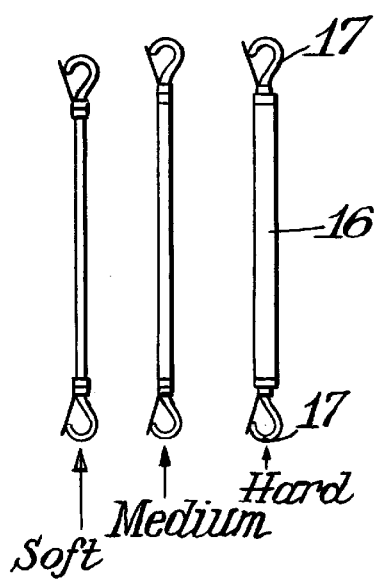
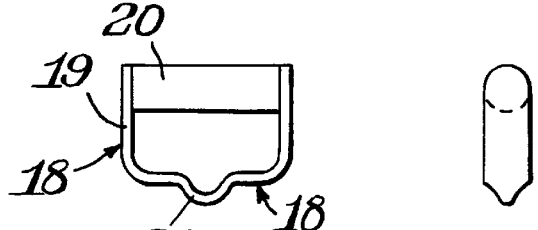
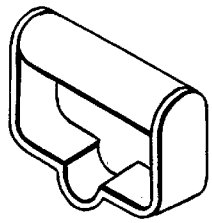

SEAT EXERCISE DEVICE

BACKGROUND OF THE INVENTION

This application claims the benefit of provisional Application Ser. No. 60/119,288 filed Feb. 9, 1999, the content of which is incorporated by reference herein in its entirety.

FIELD OF THE INVENTION

The present invention is directed to an exercise device for use for attachment to a seat or chair, and particularly for use in a vehicle by either the passengers or operator of the vehicle. More particularly, the present invention is directed to a seat cushion and connected exercise equipment that is attachable, for example, to the seat of a vehicle to provide a facility for allowing the occupant of the seat to perform a variety of exercises while seated in the vehicle.

BACKGROUND OF THE RELATED ART

Increasingly, both at work and leisure, individuals find themselves in seated positions for extended periods with little or no opportunity for physical activity and with a resultant diminution of their faculties. In particular, for example, driver fatigue and tension brought about by lack of physical activity on long trips in cars, trucks, airplanes, and other motor vehicles or crafts is a leading cause of accidents. While it has long been recommended that drivers and others operating vehicles over long distances routinely and periodically stop and get out of the vehicles to exercise themselves, such interruptions are not always practical, for example, in situations where stopping and resting facilities are not available or where traffic makes such stops inadvisable or impossible. In such situations, lengthy periods of remaining seated with minimal movement of the body and limbs can induce a form of fatigue as well as a hypnotic fixation on the road ahead that ultimately can result in the driver becoming dangerously drowsy and inattentive.

Accordingly, there is a need for a system for providing stimulating activity in the form of exercise to individuals required to be seated over extended periods, particularly to both the passengers and operator of vehicles, especially when involved in long, uninterrupted trips or when driving in heavy traffic or over extended periods of time. Such a system should be portable, relatively inexpensive and adaptable to standard seating arrangements. The system should also provide an effective and varied form of exercise for the individual without interfering with the individual's activity such as operating a vehicle or requiring that the vehicle stop during the exercise regimen.

Additional objects and advantageous of the invention will be set forth in part in the description which follows and in part will be obvious from the description or may be learned by the practice of the invention. The device can also accommodate leg exercises.

SUMMARY OF THE INVENTION

To achieve the above and other objects of the invention and in accordance with the purpose of the invention as embodied and broadly described herein, an exercise device is provided which comprises a seat cushion having a bottom and back, and a provision for the attachment of elastic straps with hand grips at various locations on the cushion to provide a device to enable the user to engage in an exercise regimen involving the arms and hands while seated on the cushion. By including a provision for attachment of the exercise straps at a variety of locations around the perimeter of the seat cushion, a large number of exercises can be performed by the individual including stretching and lifting using both the arms and wrists. Further, the degree of elasticity of the exercise straps can be varied to suit the needs of the particular individual using the device and the length of the straps can also be varied to better accommodate individuals of different size and to accommodate different exercise activities. It is to be understood that this general description and the detailed description which follows, while exemplary and explanatory, are not restrictive of the invention.

The accompanying drawings, which are incorporated in and constitute part of this specification, illustrate the embodiments of the invention and, together with the description, serve to explain the principles of the invention.

The back portion and bottom portion are hinged relative to each other at 22 to permit folding.

BRIEF DESCRIPTION OF THE DRAWINGS

FIG. 1 is a perspective view of a seat exercise device according to an embodiment of the invention present.

FIG. 2 is a top view of the exercise device shown in FIG. 1.

FIG. 3 is a back view of the exercise device shown in FIG. 1.

FIG. 4 is a side view of the exercise device shown in FIG. 1.

FIG. 5 is a side view of exercise straps of varying elasticity and attachment swivel hooks for use in the device shown in FIG. 1.

FIG. 6 is a side view of hand a grip adapted for attachment to one end of an exercise strap shown in FIG. 5.

FIG. 7 is an end view of the hand grip shown in FIG. 6.

FIG. 8 is a perspective view of the hand grip shown in FIG. 6.

DESCRIPTION OF A PREFERRED EMBODIMENT OF THE INVENTION

Figure 9:
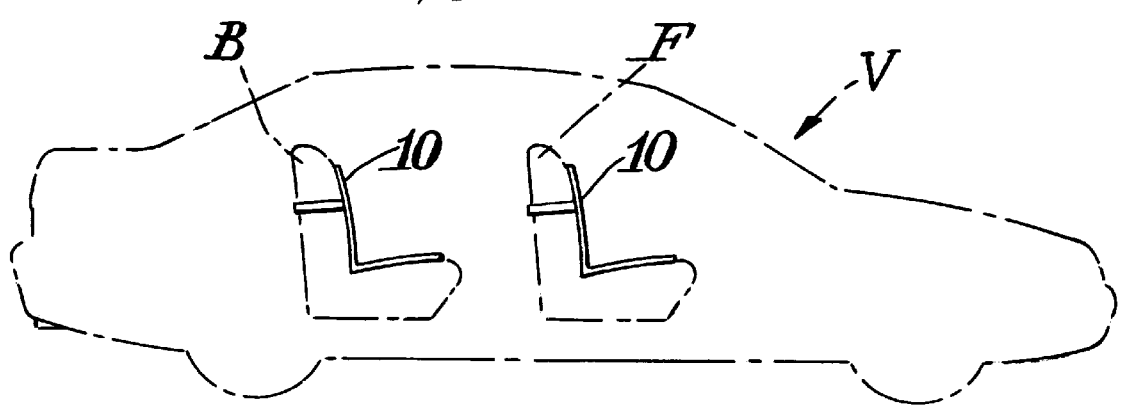
FIG. 9 is a side view of an automobile showing the exercise device of FIG. 1 on the front seat and also on the back seat.

Reference will now be made in detail to a present preferred embodiment of the invention which is illustrated in the accompanying drawings. Whenever possible the same reference numbers will be used throughout the drawings to refer to the same or like part.

In accordance with the present invention, an exercise device is provided to enable a seated individual to perform a variety of useful exercises involving various limbs and muscles, optionally while continuing the primary task with which the individual is involved. As a particular example of the utilization of the invention, the invention is herein described in connection with its use with the seats of a vehicle such as an automobile, truck, van, airplane, or train.

As illustrated in FIGS. 1–4 of the drawings, an embodiment of the present invention includes a vehicle seat shown generally at 10 having a back portion 11 and seat or bottom portion 12. This portion of the invention can be cushionized, i.e., be formed of a pair of padded, foam or semirigid mesh cushions that provide a comfortable seating environment. Surrounding the perimeter of the back and seat portions 11 and 12 is a rigid or semirigid frame 15 which can, for example, be made of wire or tubular material flat metal or a plastic extrusion. While the frame 15 can be either external or internal to the back 11 and seat 12, a plurality of fixtures in the form of loops or protuberances 14 are provided at spaced intervals around the entire perimeter of portions 11 and 12. The drawings indicate two such loops on each side of the frame, however, it will be understood that fewer or more such loops could be provided, as desired. A strap 13, preferably of elastic material, fits around the seat to hold back portion 11 to the seat back.

Attachable to any or several of the loops 14 are exercise straps 16 shown in detail in FIG. 5 of the drawings. Each exercise strap 16 has an elastic member whose thickness or width can vary to provide different degrees of resistance to stretching. Alternatively, springs of varying size and elasticity could be used. On either end of the elastic strap 16 is provided a hook, snap, or similar attachment 17, preferably through a swivel to strap 16.

As shown in FIG. 1 of the drawings, one of the swivel hooks 17 on the exercise strap is attached through a loop 14 to the frame 15 and the other swivel hook 17 at the other end of exercise strap 16 engages with an exercise grip 18 as shown in FIGS. 6, 7, and 8 of the drawings. Each exercise grip 18 preferably consists of a handle portion 20 fitted to a generally U-shaped bracket 19. Advantageously, the U-shaped bracket 19 is provided with a notch hole or loop 21 to accommodate and maintain in position the swivel hook 17 attaching it to the exercise strap.

It will be apparent that the number and position, as well as the length and elasticity of the exercise straps, can vary to provide different levels and types of exercise for individuals of different stature and strength. For example, straps attached to the lower seat portion 12 will be especially useful in providing lifting exercises utilizing the biceps. Straps attached to the back cushion frame, on the other hand, will be more appropriate for horizontal pulling exercises utilizing the pectoral or tricep muscles.

It is also contemplated that more than one strap can be used at the same time, on opposite sides of portions 11 and 12, for example, to permit simultaneous exercise with the right and left limbs. Using only one strap, the device of the invention can be employed by a vehicle operator, as well as the passengers, since one hand remains free to operate the vehicle.

It will be apparent that the exercise device of the invention can be fabricated in various sizes and dimensions to accommodate the seating facilities, both front and rear, of various vehicles including cars, vans, and trucks, airplanes or trains in addition to other applications. The exercise straps can also be of varying dimensions so as to be suitable for individuals of all sizes and ages. The device of the invention in addition to providing a means for relieving stress and improving alertness and muscle tone, for example, during trips in a vehicle, also improves circulation and oxygen to the brain and provides a means for occupying children and others riding in the vehicle and is a system that permits the individual to engage in a useful exercise regimen during time that would otherwise be wasted.

FIG. 9 shows a vehicle V in the form of a car or automobile having a front seat F and a back seat B. An exercise seat 10 could be on the front seat F and/or back seat B, as illustrated in FIG. 9. The exercise device 10 could be located at the driver's position of front seat F.

It will be apparent to those skilled in the art that various modifications and variations can be made in the exercise device of the present invention and in the construction of this device without departing from the scope or spirit of the invention.

Other embodiments of the invention will be apparent to those skilled in the art from consideration of the description of the invention as set forth herein. It is intended that the specification examples be considered as exemplary only.

What is claimed is:

1. An exercise apparatus for selective mounting on a vehicle seat having a seat back, said exercise apparatus consisting of:

a substantially flat bottom portion having a bottom cushion, a bottom perimeter and a bottom frame along said bottom perimeter with spaced fixtures along said bottom frame;

said bottom cushion having a thickness such that said bottom cushion is substantially coplanar with said bottom frame;

a substantially flat back portion having a back cushion, a back perimeter and a back frame along said back perimeter with spaced fixtures along said back frame;

said back cushion having a thickness such that said back cushion is substantially coplanar with said back frame;

said bottom frame and said back frame each made substantially of at least a semi-rigid material;

said bottom portion and said back portion are hingedly connected to one another along a common edge so that said exercise apparatus is foldable along said common edge;

at least one exercise grip and at least one elongate extensible exercise member, said at least one elongate extensible exercise member having a first end and a second end;

said first end of said at least one elongate extensible exercise member selectively secured to at least one of said spaced fixtures by a first connector;

said second end of said at least one elongate extensible exercise member selectively secured to said at least one exercise grip a second connector; and a holding strap secured to said back portion, wherein said back portion may be removable secured by said holding strap to the vehicle seat back so that a user seated on said exercise apparatus may engage said at least one exercise grip to exercise selected muscles by extending said at least one elongate extensible exercise member against the resistance to extensibility of said at least one elongate extensible exercise member.

2. The exercise apparatus of claim 1, wherein said spaced fixtures are loops and said first connector is a swivel hook.

3. The exercise apparatus of claim 1, wherein said exercise grip is a hand receiving loop and said second connector is a clasp.

4. The exercise apparatus of claim 1, wherein said at least one elongate extensible exercise member consists of a plurality of elongate extensible exercise members having different resistances to extensibility.

5. The exercise apparatus of claim 1, wherein said at least one elongate extensible exercise member is made of a resilient elastic material.

6. The exercise apparatus of claim 1, wherein said at least one elongate extensible exercise member is a resilient spring.

7. The exercise apparatus of claim 1, wherein said holding strap is made of elastic material.

\* \* \* \* \*